July 8, 1941.　　O. F. CARLSON　　2,248,807
PRESSURE RELIEF VALVE
Filed Jan. 3, 1939　　2 Sheets-Sheet 1
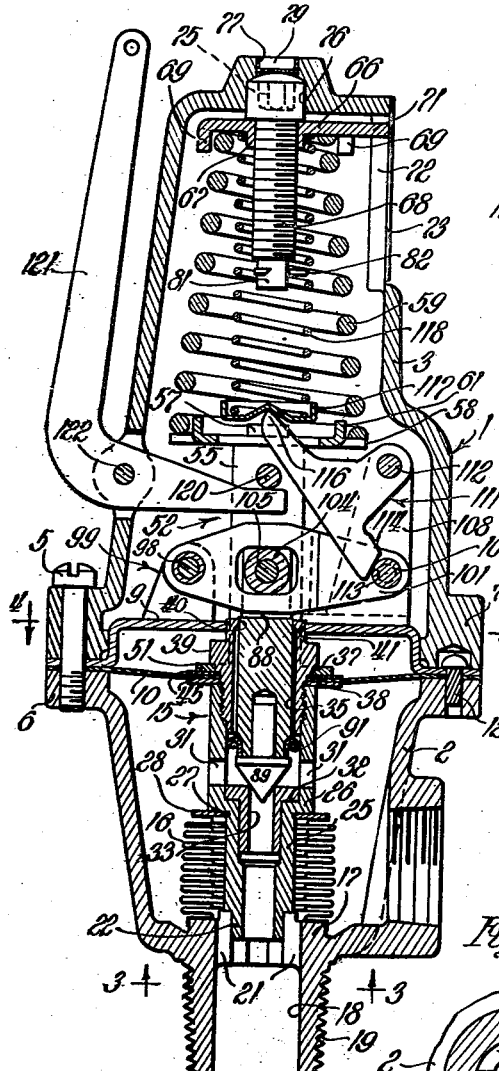
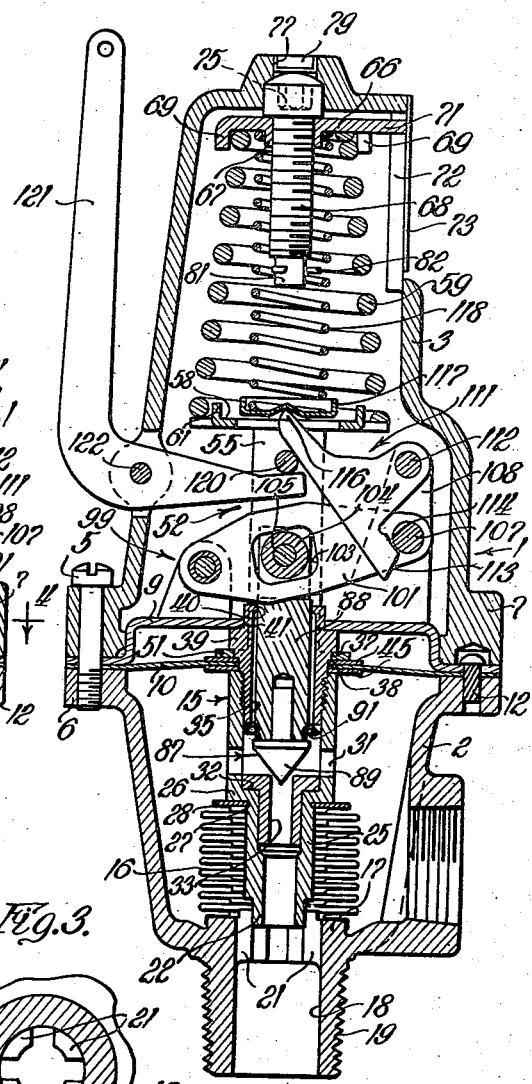
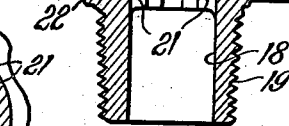
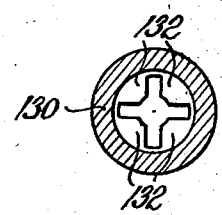
Inventor
Oscar F. Carlson July 8, 1941.　　　O. F. CARLSON　　　2,248,807
PRESSURE RELIEF VALVE
Filed Jan. 3, 1939　　　2 Sheets-Sheet 2
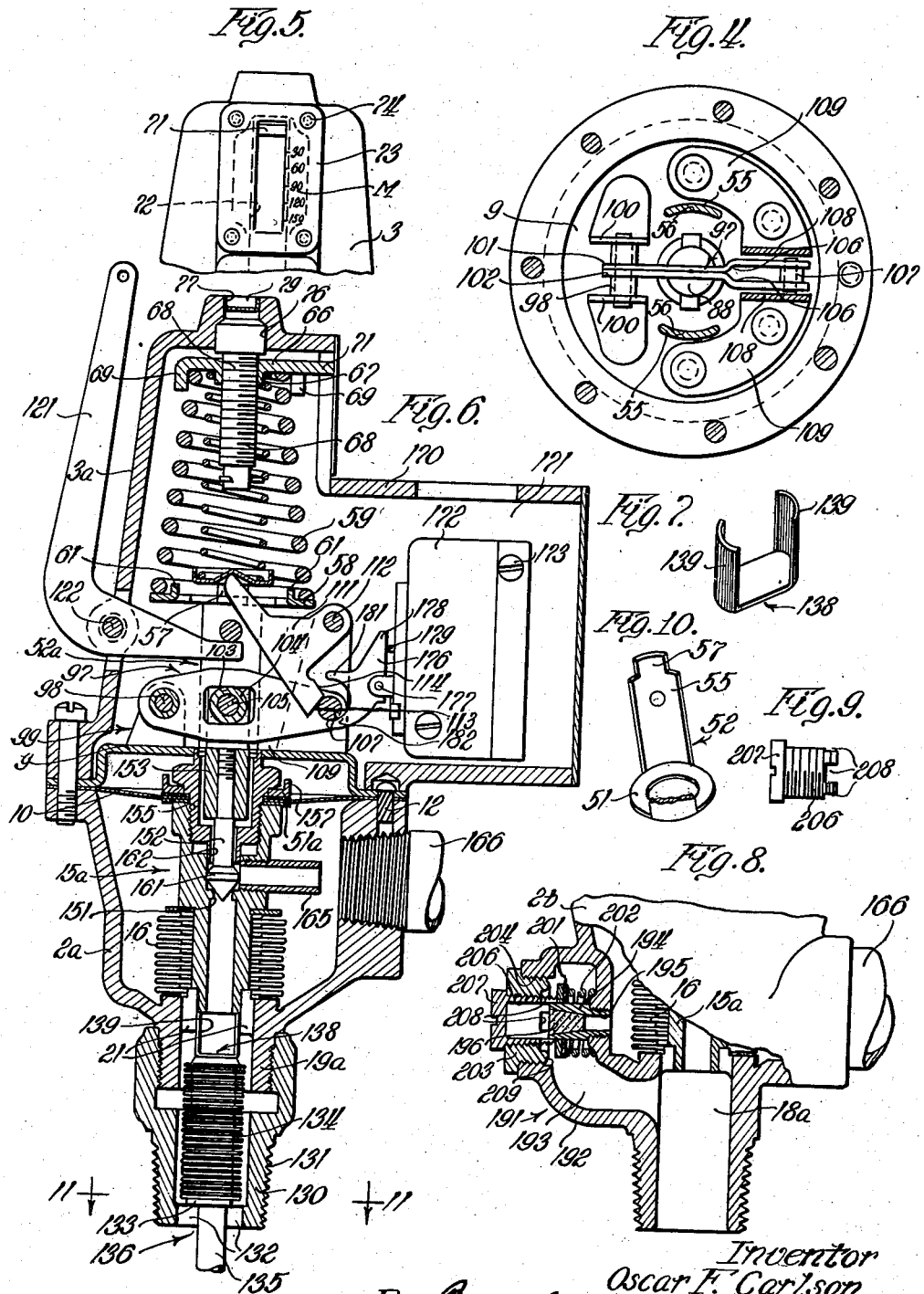
Inventor
Oscar F. Carlson
By [signature]
Attys.

Patented July 8, 1941

2,248,807

UNITED STATES PATENT OFFICE 2,248,807

PRESSURE RELIEF VALVE

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application January 3, 1939, Serial No. 248,978

20 Claims. (Cl. 137—53)

This invention relates generally to relief valves and is more particularly concerned with quick-acting valves.

For the relief of excessive internal pressures in a closed vessel such as a boiler, hot water tank, and the like, it has been common practice to provide a valve held to its seat by a predetermined spring loading. When the internal pressure acting upon the effective area of the valve member exceeds the spring loading, the valve opens and allows fluid to escape.

The fault of that type of valve is that as the critical pressure is approached the force holding the valve upon its seat approaches zero. The valve, therefore, tends to leak, and does not have a definite positive action.

Valves with extensive bearing between the valve member and the seat have been employed to secure the effect of increased area as the valve opens. Such valves tend to pop and chatter and also are hard to keep tight.

It has heretofore been proposed to provide a snap action for a pressure relief valve as by placing a cam or hill-shaped projection on the stem and a spring pressed roller or follower on the valve frame so that as the crest of the cam passes over the roller or follower the spring action of the roller or follower which normally opposes opening of the valve then assists in raising the valve from its seat.

While in theory such a scheme would appear to be operable, in practice it does not work out because the valve must move a substantial distance before the crest of the cam can pass the follower. But in moving the aforesaid distance, the valve must leave its seat. Hence, such a valve is no more than the usual spring loaded valve with the usual marginal mode of operation, with the usual tendency to leakage as the critical pressure is approached.

I have conceived according to the present invention a valve in which the seat and the valve member remain in contact under a predetermined spring loading which loading is applied through a cam and roller. The necessary motion for causing the idler to ride off the effective face of the cam is secured in a spring loaded pressure operated motor member which causes the necessary motion to be produced at the desired pressure without producing motion between the valve and its seat. In the preferred form of the invention, the valve and seat member while remaining in firm contact both move so that the necessary motion of the cam relative to the follower (or vice versa) is secured before the seat and valve member are allowed to separate.

According to the preferred form of my invention, the seat is mounted on a movable support or member, preferably a metallic bellows. I prefer the bellows because greater motion in less diameter can be secured with the bellows than is possible with other means. This support for the valve seat has greater effective area than the effective area of the valve upon its seat.

A strong spring opposes expansion of the bellows. The valve member or plug rests upon the seat and is held thereagainst by a spring loaded snap means consisting of a hill-shaped cam and a roller or equivalent means. The snap loading spring acting through the snap mechanism such as the cam and roller presses the valve against its seat. One element of the snap mechanism is arranged to be moved by the valve stem and the other such as the hill-shaped cam is carried on the frame of the valve body. The snap action loading spring acts between the cam and a stationary abutment.

The loading of the valve member against the seat by the snap action loading spring may be made substantially greater than the force of the fluid pressure upon the effective area of the valve for all settings of the device. This is because the valve is pushed by the expansion of the bellows against the main loading spring on the opening stroke and by the powerful main loading spring collapsing the bellows on the return stroke.

Thus the bellows and the main loading spring constitute a fluid pressure sensitive motor that pushes the valve member over the hill of the cam to make the outer stroke, when the predetermined maximum pressure is reached and pulls the valve member back over the hill of the cam to make the return stroke, when the pressure has been reduced to a predetermined minimum.

Thus the valve, so long as it is in closed position, is held against its seat with a force substantially greater than the outward pressure of the contained fluid pressure. It is moved or allowed to move away from its seat by a reversal or at least sharp reduction of the force tending to hold it to seat. Similarly, it is restored to seat by a force great enough to secure a positive and effective closure but not until the pressure has been reduced by the desired amount. Hence, leakage, chattering, or popping of the valve is avoided. Surprising accuracy of opening and closing is attained.

Where the valve is to be employed in a water heating or hot water system, a thermostatic element may be employed as an auxiliary motor element to push the valve seat up against the loading spring and compel opening of the valve by the operation of the snap mechanism. Thus, if the temperature of the heated water for any cause should exceed the temperature corresponding to the predetermined pressure of saturated steam at which the valve is set to open, the thermal element would come into play and act as a safety means for opening the valve and holding it open until the temperature were reduced preferably to that not exceeding the corresponding temperature for the pressure at which the valve is set to close.

Now in order to acquaint those skilled in the art with the manner of constructing and operating a device embodying my invention, I shall describe in connection with the accompanying drawings a specific embodiment of the same and its mode of operation.

In the drawings:

Figure 1 is a longitudinal section taken through a pressure relief valve unit constructed according to the principles of this invention with the parts shown in the positions they occupy when the valve is closed;

Figure 2 is a view similar to Figure 1, showing the parts in the positions they occupy when the valve has been opened;

Figure 3 is a fragmentary view taken along the line 3—3 of Figure 1, showing the lower guide lugs for the shiftable valve unit, the latter being omitted in Figure 3;

Figure 4 is a view taken along the line 4—4 of Figure 1;

Figure 5 is a fragmentary view, illustrating a portion of the means for indicating the pressure for which the valve has been adjusted to be responsive;

Figure 6 is a sectional view similar to Figures 1 and 2, illustrating the application of a temperature responsive unit and a safety cut-out switch to the type of pressure relief valve shown in Figures 1 and 2;

Figure 7 is a fragmentary view of a portion of the connection between the temperature responsive unit and the valve controlling mechanism;

Figure 8 is a fragmentary sectional view showing a fusible temperature responsive element arranged to protect the relief valve and provided with means for automatically sealing off a portion of the unit to permit the replacement of the fusible element without placing the valve unit out of service;

Figure 9 is an elevation of the removable plug which provides access to the fusible element;

Figure 10 is a fragmentary view of the spring bracket connecting the biasing spring with the shiftable valve duct; and Figure 11 is a view taken along the line 11—11 of Figure 6, similar to Figure 3, showing the seating lugs receiving the temperature responsive element.

Referring now more particularly to Figures 1 to 4, inclusive, the pressure relief valve construction of the present invention includes a casing indicated in its entirety by the reference numeral 1, which includes a lower casing portion or valve body 2 and an upper section or spring housing 3. The two halves of the casing 1 are secured together by cap screws 5 disposed in apertured flanges 6 and 7 which form a part of the lower and upper casing sections 2 and 3. Between the parts 2 and 3 a guide plate 9 and a spring diaphragm 10 are clamped. Preferably, the diaphragm 10 and plate 9 are fastened to the valve body 2 by rivets 12 before the spring housing 3 is attached to the valve body 2.

A valve seat holder in the form of a tubular member 15 is mounted at the upper or outer end of a flexible metal bellows 16, the lower end of which is sealed, as by soldering, to a shoulder 17 formed about the inlet 18 of the valve body 2. The inlet 18 is provided with external threads 19 and also carries radially inwardly extending guide lugs 21 (see Figure 3) that receive the lower end 22 of the member 15. The part 22 is formed at the lower end of a cylindrical portion or hollow stem 25 of the member 15, and between the portion 25 of the member 15 and the upper part thereof is a shoulder 26 adjacent which is a groove 27 that is adapted to receive a bellows washer 28. In assembly, the washer 28, which is initially of conical formation, is seated with the apex against the shouldered section 26 of the member 15, and then the washer 28 is flattened which forces the same into tight and leak proof engagement with the member 15 in the recess 27. The bellows 16 is sealed to the washer 28 in any suitable manner, as by soldering or the like.

The upper portion of the member 15 is enlarged and is provided with side ports 31 adjacent which the member 15 is shouldered, as at 32, and receives a valve seat 33. The upper part of the member 15 is completed by a sleeve in the form of a back pressure tubular seat 35, the latter being threaded to the upper portion of the part 15 and is provided with a pair of stepped seats 37 and 38, a flange 39 and an upper stem guide in the form of a radially inwardly extending flange 40. This upper part of the sleeve 37 is disposed for sliding movement in an aperture 41 formed in the central portion of the top guide plate 9. Thus, the member 15, which is sealed to the movable end of the bellows 16, is movable axially of the inlet 18 as the bellows 16 expands and contracts under pressure changes, being guided in this movement by the plate 9 and the lugs 21 at the lower end of the housing 1. A pair of diaphragm washers 45 (Figure 2) are disposed on opposite sides of the central portion of the diaphragm 10 and the upper member 35 of the part 15 is extended down through the opening in the diaphragm 10. The diaphragm washers 45 are disposed against shoulders 38 so that when the member 35 is screwed down tight into the outer end of the member 15, the central portion of the diaphragm 10 is securely clamped thereto.

When the section 35 is tightened, it also secures the intermediate portion 51 of a U-shaped strap member indicated in its entirety by the reference numeral 52 in Figures 1, 2, 6 and 10. The member 52 serves as a part of the means by which a biasing force is applied to the part 15 to resist outward expansion of the bellows due to the fluid pressure at the inlet 18 to which the interior of the bellows is subjected. As best shown in Figure 10, the member 52 includes a pair of upwardly extending arms 55 (see Figure 4) which extend upwardly from the space within the valve body 2 through a pair of slots 56 formed in the top guide plate 9. The arms 55 are spaced apart, as indicated, and at their upper ends are reduced, as at 57, and inserted into suitably formed slots in a plate 58 serving as a base for a biasing spring 59, the lower end of the latter seating against the plate 58. In order to hold the spring 59 in place on the plate 58, tongues 61 are slit and are bent upwardly a short distance substantially equal to the diameter of the wire from which the spring 59 is formed. It will also be noted that the ends 57 of the arms 55 are also extended through the plate 58 a similar amount, thereby cooperating with the tongues 61 to maintain the lower end of the spring 59 in place.

It will thus be seen that the U-shaped member 52 constitutes a bracket or strut for the spring 59 by which the effective force of the latter is exerted through the apertured intermediate section 51 against the tubular member 15 so as to hold the latter and the valve seat 33 against movement until the pressure to which the interior of the bellows is subjected increases to a predetermined amount.

The upper end of the spring 59 bears against a top washer 66 which has an interior section 67 threaded to receive an adjusting screw 68. The plate 66 is also provided with tongues 69 turned downwardly to receive the upper end of the spring 59. Also, the plate 66 is provided with an outwardly extending tongue 71 which normally is disposed in a slot 72 formed in the upper portion of a spring housing 3. The end of the tongue 71 forms an index which is read in connection with pressure markings M etched or otherwise formed on a plate 73 secured by screws 74 or the like to the spring housing 3 about the slot 72.

The head of the adjusting screw 68 is provided with a polygonal socket 75 which is adapted to receive any suitable tool for turning the screw 68. The head of the screw 68 is seated in a suitably formed recess 76 in the upper part of the spring housing 3, and an opening 77 in the latter provides for access to the adjusting screw 68. A sheet metal cup member 79 serves to seal the opening in the upper end of the spring housing 3 and prevents unauthorized tampering with the adjusting screw 68. The disposition of the tongue 71 in the slot 72 of the spring housing 3 also effectively prevents rotation of the plate 66 when the adjusting screw 68 is turned. The lower end of the latter is reduced, as at 81, and carries a cotter pin 82 or similar part which prevents any one from turning the adjusting screw 68 far enough to disengage the plate 66 from the screw 68.

The valve that controls flow from the inlet 18 through the lower part 25 and side ports 31 of the member 15 is indicated in its entirety by the reference numeral 87 and consists of a valve stem 88 and a valve member or plug 89, the latter being formed as a headed member having a shank fixedly secured within an opening in the lower end of the stem 88. A collar 91 having a downturned periphery is fixed to the stem between the latter and the valve member 89 and is adapted to engage the lower end of the sleeve 35 when the valve 87 is raised off the seat 33. The lower end of the sleeve 35 thus serves as stop means limiting the upward movement of the valve 87. The upper end of the valve stem 88 is slotted to receive a lever or rocker arm 97, one end of which is pivoted by means of a pin 98 to a lug or bracket 99 which is in the form of tabs 100 struck up from the plate 9. The pivot pin 98 is best shown in Figure 4. The end of the lever 97 is held centrally between the ears or tabs 100, 100 by sleeves on the pin 98.

The lever or rocker arm 97 consists of two bars 101 and 102 (Figure 4) and each is provided with an elongated slot 103 in which is disposed a roller 104 mounted for rotation on a pin 105 carried at the upper end of the valve stem 88. The outer end of each plate is offset, as at 106 in Figure 4, to provide space for a cam roller 107 at the end of the lever opposite the brackets 99. The cam roller 107 is disposed between a pair of upwardly extending brackets 108 each of which includes a base 109 which is riveted or otherwise secured to the guide plate 9.

A detent member in the form of a cam or bell crank lever 111 is pivoted on a pin 112 that is carried on the upper end of the two brackets 108. One end of the lever 111 is provided with oppositely disposed inclined cam surfaces 113 and 114, the roller 107 being adapted to bear against one or the other of the aforesaid surfaces. The outward end of the lever 111 is pointed, as at 116, and receives a flanged washer 117 in which a detent spring 118 is seated. The outer end of the spring 118 is disposed about the flange 67 on the adjusting plate 66 and bears against the central portion of the adjusting plate 66 that receives the adjusting screw 68.

The arms 55 carry a pin 120 against which the inner end of a hand lever 121 bears. The lever 121 is pivoted on a pin 122 carried in a slotted portion of the spring housing 3 into which the lever 121 extends. Pulling outwardly on the outer end of the lever serves to raise the member 52, which extends the bellows, lifts the member 15 and eventually swings the cam roller 107 from the cam surface 113 onto the other cam surface 114, whereupon the bias of the spring 118 is effective to snap the valve member 89 into its open position away from its seat 33.

As is obvious, turning the adjusting screw 68 shifts the adjusting plate 66 inwardly or outwardly, thereby increasing or decreasing the tension in both the springs 59 and 118. Thus, when the device is adjusted for high pressures so as to open only when such high pressures are realized, the tension of the spring 118 is likewise increased as is necessary, not only to keep the valve member 89 from opening before the bellows expands against the tension of the spring 59 but also to secure a somewhat wider differential between the opening and closing of the valve. The portion of the index along the scale M gives a reading of the pressure for which the device is set to respond.

The operation of the valve of Figures 1 to 5 is as follows: With the parts in the position shown in Figure 1, the bellows is collapsed to minimum length by the expansive force of main loading spring 59. The pressure of this spring 59 pushes the bracket 52 with attached tubular member 15 downwardly until the shoulder at the lower end of member 15 engages the tops of stationary wings 21. At the same time the valve stem 88 holds the conical valve plug 89 against the seat 33. The stem 88 is thrust down by the lever 97, the slot in which engages the roller 104 carried in the slot in the uper end of the valve stem 88.

The outer (righthand end in Figures 1 and 2) end of the lever is thrust downwardly by the cam face 113 bearing against the top half of the roller 107 carried on the outer end of the lever 97. The snap action loading spring 118 bears against the upper arm of lever 111 thereby tending to swing the said lever 111 in a counterclockwise direction and causing the cam face 113 to exert the aforesaid downward pressure on the roller 107 of lever arm 97.

It is to be observed that main loading spring 59 determines by its pressure when the valve will be opened. When the blow off pressure, i. e., the internal fluid pressure at which the valve is supposed to open is reached, that pressure expands the bellows 16 against the loading spring 59. Expansion of the bellows 16 carries the seat 33 with the valve seated upon it upwardly, swinging the lever arm 97 in counterclockwise direction in Figures 1 and 2, to a point where the roller comes to the crest of the cam, i. e., at the top of the hill formed by the inclined surfaces, 113—114. When this occurs, there is no force holding the valve 89 against its seat and the pressure raises it past the crest of the hill. Thereupon the roller 107 runs along the inclined surface 114 into the position shown in Figure 2. This snaps the valve open and the fluid under pressure escapes past valve 89 and out through ports 31 into the part of the casing 2 below the sealing diaphragm and out the exhaust opening in the side of the casing.

While the valve has been snapped to wide open position, there is sufficient throttling of pressure at this point to keep an effective pressure inside the bellows 16, tending to hold the bellows expanded. It will be noted that the collar 91 between the head of the valve plug 89 and the shoulder formed on the lower end of sleeve 35 prevents the member 15 from moving down without carrying the valve member 89 and its connected stem 88 down with it. However, the valve stem 88 is retarded by the lever 111 and its loading spring 118. That is to say, the roller 107 engaging the cam surface 114 is held from descent by a yielding force which because of the shorter lever arm, relative to pivot 112, is greater than was the force applied through cam surface 113 holding the valve to seat. In other words, the spring 118 acting through the cam lever 111 has an effective holding force on the movable system against downward motion. And, incidentally, this force is greater than was the downward pressure exerted when the valve 39 was on seat.

The retarding force of the spring 118 and lever acting through cam face 114 upon the roller 107 prevents the main loading spring 59 from moving the system including valve stem 88 and valve 89 down until the pressure in the bellows and in the vessel to which the bellows is connected has been blown down to a certain predetermined minimum.

As this minimum or blown down pressure is reached, the main spring begins to overcome the joint resistance of the cam and of the bellows 16, and moves the system down. As soon as this movement has proceeded to a point when the roller 107 on the arm 97 rides down over the crest of the hill onto cam surface 113, the direction of the force of the spring 118 is reversed and the valve 89 is snapped to its seat. This reversal of the force of spring 118 allows the main spring to collapse the bellows 16 and force the member 15 against the stop wings 21. The valve parts thus assume again the position of Figure 1.

It is to be noted that the bellows 16 working against the main spring 59 constitute a pressure motor that moves the valve stem while the valve is on seat to cause the snap action to lift the valve from seat. Likewise, after the valve is open, the loss of pressure in the bellows 16 permits the spring 59 to force the stem past the hill of the snap action which snap action throws the valve back onto seat and holds it there.

The valve construction described above may be provided with means to open the valve if the temperature of the fluid adjacent the inlet 19 exceeds a predetermined degree, as well as being responsive to pressure as described above. Referring now more particular to Figure 6, the lower end of the valve body 2a is provided with a nipple section 19a externally threaded and receives a coupling or nipple 130, the upper end of which is screwed in leak-tight relation onto the lower end of the valve body 2a. The other end of the coupling 130 is externally threaded, as at 131, and is adapted to be screwed into the associated container. The lower end of the nipple 130 is provided with lugs 132 best shown in Figure 11 and a seating washer 133 is disposed between the lugs 132 and one end of a bellows 134 which expands and contracts according to the temperature to which the bulb 135 of the thermostatic means, indicated in its entirety by the reference numeral 136, is subjected. The upper end of the bellows 134 acts against a U-shaped guide 138, best shown in Figure 7, which has two arcuate arms 139. It will be noted that the diameter of the bellows 134 is less than the internal diameter of the nipple 130, so that there is ample space for fluid to pass up between the guides 132, and between the bellows 134 and the inner wall of the nipple 130. The U-shaped connector 138 is seated against the movable end of the bellows 134 and its arms 139 are curved so as to be guided in its vertical movement by lugs 21a similar to the lugs 21 described above.

The upper ends of the arms of the connector 138, as shown in Figure 6, are arranged to operate a valve construction similar to the valve construction shown in Figures 1 and 2 but one in which certain additional features are incorporated. It is to be understood that the temperature responsive unit 136 and associated parts may be arranged to control the valve shown in Figures 1 and 2 by changing the nipple end 19 to fit the coupling 130, or the latter to fit the nipple 19.

Referring now to the valve mechanism shown in Figure 6 it will be seen that parts substantially identical with those shown in Figures 1 and 2, and wherever this occurs, the same reference numerals have been applied.

In this form of the invention the bellows 16 is secured to a tubular valve member 15a which has a central bore with an integral valve member seat 151 against which a needle valve 152 is adapted to close. The shank of the valve member 152 is reduced and threaded and is connected into a plunger 153 the upper end of which is bifurcated and receives the roller 104 and pin 105 described above. The lower end of the plunger 153 is received within a threaded collar 155 which screws into a recess in the upper end and forms a part of the tubular member 15a, clamping the sealing disc 10 and the central part 51a of a spring bracket 52a in place. In this form the part 51a has a reenforcing flange 157.

The upper ends of the arms 139 of the connector 138 seat against the lower end of the tubular member 15a. Thus, if the temperature should rise to some predetermined value, the bellows 134 will expand and raise the member 15a in substantially the same manner that an excess pressure will raise the same. The upward movement or expansion of the bellows 16, whether due to a pressure increase or a temperature increase, opens the valve 152 with a snap action, which holds the valve in its wide open position or fully closed position. It will be noted that, when the valve member 152 is displaced to the open position in response to a temperature increase or a pressure increase, the tapered section 161 seats against the lower end 162 of the collar 155, thus preventing the escape of any liquid along the upper end of the valve stem and into the space above the top guide plate 9. While, as illustrated in the drawings, the nipple section 19a is not shown as exactly the same as the nipple section 19 of Figure 1, these parts may be identical if desired, in which case the temperature responsive unit 136 and its nipple 130 may be sold separately and applied to any of the instruments constructed as shown in Figure 1.

Due to the spaced apart arrangement of the lower lugs 132 and of the upper lugs 21, together with the spacing of the bellows 134 from the inside walls of the nipple 130, there is a free flow of fluid up into the valve unit under the control of the valve member 152.

It will be noted that the bellows 16 is the pressure responsive unit and that the diaphragm 10 is not intended to be responsive to pressure. The only purpose of the diaphragm 10 is to prevent the fluid which passes into the valve body 2a when the valve is open from reaching the spring housing 3a. Therefore, under conditions where the outlet may be connected or dsiposed so that the opening of the valve might tend to fill the valve body 2a with fluid at such pressure that, acting against the diaphragm 10, the action of the valve would be affected, according to the form of invention shown in Figure 6 the tubular member 15a is provided with a nozzle 165 which extends to a point relatively close to the end of the waste or discharge pipe 166. The construction is such that when the valve member 152 is displaced to the open position, the discharge of fluid under pressure through the nozzle 165 and into the pipe 166 does not tend to build up the pressure to a point such that the operation of the valve would be materially affected.

The relief valve of the present invention is particularly adapted for hot water heating systems for domestic use, but it is to be understood that this invention is not to be limited to domestic systems. In domestic hot water systems it is desirable to provide a form of pressure relief other than the usual expansion tank in the attic. Where closed systems are utilized, some form of pressure relief is essential, and the present invention has been designed to provide a pressure relief valve for such use.

Domestic heating systems as a rule include a boiler, a fuel feeding device for delivering fuel, either solid, liquid or gaseous, and suitable control means for governing the amount of fuel delivered. Usually a room thermostat is provided for starting and stopping the fuel delivery, and one feature of the form of the invention shown in Figure 6 is the provision of means automatically cutting off the fuel delivering means when the pressure increases to the point where the valve opens to relieve the pressure.

The spring housing 3a is extended at 170 to provide a side chamber 171 in which a safety cutout switch 172 may be mounted, as by screws 173. The switch 172 may be of any suitable construction, the details per se of which are not of concern in this invention. The operating means for the switch includes a bell crank lever 176 pivoted at 177 and having one arm 178 arranged to actuate the plunger 179 of the switch 172. The other arm of the bell crank lever 176 includes a pair of spaced apart abutments 181 and 182 disposed adjacent and embracing the cam roller 107.

The operation of this feature of the invention is believed to be obvious. Whenever the pressure or temperature rises to a predetermined value, according to the setting of the adjusting screw 68 or the construction or adjustment of the thermostatic unit, the bellows 16 expands and/or the member 15a shifted upwardly until the cam roller 107 passes from one side 113 to the other side 114 of the cam lever 111, whereupon the valve member 152 is moved to the open position with a quick movement. This movement of the lever 111 and the cam roller 107 causes the latter to bear against the upper stop 181, which swings the bell crank lever 176 and opens the burner circuit through the cutout switch 172. Obviously, of course, the switch 172 may be used to operate circuits other than or in addition to circuits controlling the burner. For example, the switch 172 may be connected to control an alarm circuit or other forms of control units.

The operation of the form of device shown in Figure 6 for fluid pressure, unaccompanied by temperature, is the same as that described in connection with Figures 1 and 2. However, assume that the device of Figure 6 is connected to a hot water heater, where water is the fluid medium. In this case, the expansion of the water into steam, at a pressure great enough to expand the bellows 16 against the main spring 59, will cause opening of the valve, and reduction of the pressure, and consequently of the temperature of the water in the boiler or heater. If, however, for any reason, the valve should fail to open, at the desired pressure, then the expansible bellows 134, responsive to temperature, will expand and force the member 15a upwardly, causing the valve to pop open. Thus, the expansible thermostatic bellows 134 which is set to operate at a temperature corresponding to the blowoff pressure, or a temperature slightly higher than the same, acts as a follow-up element, and will insure opening of the valve if for any reason the pressure does not do so. The expansible bellows 134 of the thermostatic element is positive and is additive to the internal pressure in the bellows 16.

After the valve opens, the roller 107 will be held on the cam surface 114 until the pressure has been sufficiently reduced in the bellows 15, and also until the temperature has been sufficiently reduced with respect to the thermostatic bellows 134, that the main spring 59 is able to move the movable system, including the valve, and its stem, downwardly, carrying the roller 107 over the crest of the hill onto the cam surface 113 and thereby reclosing the valve.

Another form of temperature control, especially adapted for the valve construction shown in Figures 1, 2 and 6 but not necessarily limited to association therewith, is shown in Figure 8. In this form of the invention a valve body 2b is extended, as at 191, to form a conduit 192 leading from the inlet 18a into the interior of the valve body 2b and hence in communication with the outlet 166. The conduit includes a passage 193 that extends up alongside a portion of the valve body 2b and communicates with the interior of the latter through a short tube 194, the inner end of which is threaded into a suitable tapped ending 195. The tube 194 is normally closed by a fusible plug 196, which thus prevents flow through the conduit 193 into the valve body 2b. If the temperature to which the fusible plug 196 is subjected exceeds a certain degree, the plug melts and the fluid flows through the passage 193 and the tubular member 194 into the valve body 2b and out of the outlet waste or other part of disposal through the pipe 166, even though the relief valve remains closed.

In the event that the plug 196 fuses upon the occurrence of a temperature high enough to melt the plug, it is then necessary to insert a new plug in order to place the valve unit back into service. Disposed about the tube 194 is a slidable valve plate 201 which is biased by a spring 202 for movement toward the left as viewed in Figure 8. A threaded bushing 203 is screwed into a tapped hole 204 formed in the wall of the conduit 192 in axial alignment with the tube 194 and the passage therethrough. The bushing 203 is internally threaded, as at 206, and receives a screw plug 207, the inner end of which is formed, as best shown in Figure 9, with a number of slots 208 extending axially of the screw plug 207 a distance sufficient to allow fluid entering through the inlet 18a to reach the fusible plug 196. At the same time, the lengths of the slotted sections are sufficient to press the valve 201 away from its seat 209 on the bushing 203 so that when the plug 196 melts there is a relatively unrestricted flow from the inlet 18a through the tube 194 to the valve body and the outlet 166.

To replace the fusible plug 196 it is merely necessary to remove the screw plug 207, the unscrewing of the latter automatically permitting the spring 202 to force the valve 201 tightly against the seat 209, thereby isolating the interior of the tube 194 from the passage 193. Thus, the mere unscrewing of the plug 207 to put in a new plug 196 automatically causes the valve 201 to close, thus enabling the fusible element 196 to be replaced without removing the valve unit from the line or otherwise putting it out of service.

While I have shown and described above the preferred structure in which the principles of the present invention have been embodied, it is to be understood that my invention is not to be limited to the specific details shown and described above but that, in fact, widely different means may be employed in the practice of the broader aspects of my invention.

What I claim, therefore, and desire to secure by Letters Patent is:

1. A pressure relief valve comprising a spring loaded bellows subjected to the pressure to be controlled, a valve seat carried at the movable end of said bellows and moved outwardly by expansion of the bellows against said spring loading, a valve closing said seat and opening outwardly with said pressure, and snap action mechanism connected with said valve for moving the latter away from said valve seat in response to movement of said bellows.

2. A pressure relief valve comprising an expansible bellows fixed at one end and carrying a valve seat at its other end, a valve for said valve seat, means carried at said other end of the bellows for supporting said valve and limiting the movement thereof away from said seat, spring means acting against said valve supporting means for resisting outward movement of said other end of the bellows as the pressure to which the latter is subjected increases, and snap action means acting against said valve for holding said valve in closed position until said spring means yields a predetermined amount, said snap action mechanism then shifting said valve to open position against said limiting means.

3. A pressure relief valve comprising a casing having an inlet, a flexible bellows sealed to said inlet and carrying a movable valve seat through which fluid flows from the inlet into said casing, the latter having an opening to vent said fluid, a movable valve carried by said bellows and shiftable for movement toward and away from said seat, stop means carried by said bellows for limiting the movement of said valve away from said seat, means carried by said casing for guiding the movement of said valve and valve seat in response to pressure changes, means resisting movement of said valve and valve seat, and means for snapping said valve against said stop means after said valve and valve seat have moved a predetermined amount in response to a pressure increase sufficient to overcome said resisting means.

4. A pressure relief valve comprising a flexible bellows subjected to the pressure to be relieved and having one end fixed and the other end movable in response to pressure increases, a valve seat carried by said movable end of the bellows, a valve therefor, means limiting the outward movement of said valve away from said seat, spring biased snap action means having oppositely inclined cam surfaces, a part movable with said valve as the latter is shifted by expansion and contraction of said bellows, said part being adapted to engage one or the other of said inclined cam surfaces, and spring means acting against said bellows to resist the expansion thereof, said biased snap action means acting to press one of said inclined surfaces against said part to hold said valve against said seat until the pressure acting on the bellows rises to a value great enough to expand said bellows against said spring means and said biased snap action means a distance sufficient to carry said part onto the other inclined cam surface, whereupon said biased snap action means acts through said part to shift the valve against said limiting means and to hold the valve in open position until the pressure is reduced to a point where the force of said spring means is adequate to contract said bellows and carry said part back onto said first named inclined cam surface.

5. A pressure relief valve as set forth in claim 4 wherein the fixed end of said bellows is secured to a casing and said snap action mechanism includes a lever pivoted to the casing.

6. A pressure relief valve as set forth in claim 4 wherein a part is provided for simultaneously adjusting the bias exerted by said spring means and said detent means.

7. Valve mechanism comprising a casing, a valve movably mounted therein, spring means acting against said valve for opposing movement thereof, means carried by the casing and acting against said spring means for adjusting the bias exerted by the latter, snap action mechanism initially opposing movement of the valve until a predetermined amount of movement has occurred and thereafter aiding the opening thereof, and spring biasing means connected with said snap action means and reacting against said adjusting means whereby operation of the latter to adjust the bias of said first mentioned spring means also adjusts the spring means biasing said snap action mechanism.

8. A pressure relief valve according to claim 7 wherein said casing is provided with a slot therein and said bias adjusting means is provided with a portion extending into said slot, there being graduations to indicate the pressure for which said adjusting means adjusts the tension of said springs.

9. Valve mechanism comprising a casing carrying a valve seat, a valve movably mounted in said casing toward and away from said valve seat, a slotted member having spaced apart arms and connected at one end to said valve, a coil spring connected with the other end of said slotted member, adjusting means carried by said casing and receiving the reaction of said coil spring, said adjusting means being movable to vary the effective bias exerted by said coil spring through said slotted member against said valve, a lever pivoted at one end to said casing and extending transversely of said valve between said arms, means connecting the intermediate portion of said lever to said valve, and snap action mechanism associated with the other end of said lever.

10. Valve mechanism comprising a casing carrying a valve seat, a valve mounted for movement in said casing toward and away from said valve seat, a U-shaped member having spaced apart branches and connected at one end to said valve, a coil spring connected with the other end of said U-shaped member, a spring seat carried by said casing and receiving the reaction of said coil spring, the effective bias exerted by said coil spring acting through said U-shaped member against said valve, a cam lever pivoted to said casing and cooperating with said valve, a second coil spring disposed within said first coil spring and acting at one end against said lever and at the other end against said spring seat, and means connecting the valve and said lever so that the latter initially opposes movement of said valve in one direction until the extent of said movement exceeds a predetermined amount and thereafter acts to assist such movement, said lever and said connecting means being disposed at least partially between the branches of said U-shaped member.

11. A pressure relief valve comprising a casing having an inlet, a bellows sealed at one end about said inlet, a tubular member sealed to the other end of said bellows and extending into said casing, means carried by the casing adjacent opposite ends of said tubular member for guiding the movement thereof, a flexible sealing diaphragm secured to said casing and to said tubular member for closing off the portion of the casing carrying said bellows from the other portion of the casing, a valve seat carried by said tubular member, a valve also carried by said tubular member and movable toward and away from said seat, spring means in said other portion of the casing for resisting movement of said tubular member, and snap action mechanism also disposed in said other portion of the casing and acting against said valve to hold the same against its seat until the movement of said tubular member exceeds a predetermined amount.

12. A pressure relief valve comprising a casing having an inlet, a bellows sealed at one end about said inlet, a tubular member sealed to the other end of said bellows to move therewith and having vent means outside the bellows, a valve seat carried by said tubular member, a valve movably supported within the tubular member for movement toward and away from said valve seat to control the flow of fluid through said bellows and having an end extending outwardly of said tubular member, guiding means carried by said casing for guiding the movement of said tubular member as said bellows expands and contracts under the influence of changes in the pressure to which said bellows is subjected, said guiding means including a plate fixed to said housing and an aperture to which one end of said tubular member extends, there being slots formed in said guiding plate, a U-shaped member having its intermediate portion fixed to said tubular member and arms extending through said slots, spring means reacting against said casing and connected to the outer ends of said arms for resisting expansion of said bellows and the consequent movement of said tubular member, a lever disposed between said arms and pivoted to said guide plate at the side thereof opposite said bellows, a roller connection between the outer end of said valve and said lever, a spring biased cam having one face engaging the other end of said lever for holding said valve against its seat as said tubular member is moved by the expansion of said bellows against the tension of said spring means, said cam member being formed so that after a predetermined amount of movement has occurred said cam member acts against said lever for opening said valve, and stop means carried by said tubular member and defining the opening position of the valve, said cam member acting through said lever and valve to oppose contraction of said bellows under the bias of said spring means until the pressure to which said bellows is subjected has been reduced below the point at which the pressure to be relieved exceeds the bias of said spring means and the effective initial bias of said cam member.

13. A pressure and temperature relief valve comprising a casing having an inlet, a bellows having one end sealed to said casing about said inlet, a tubular member sealed to the other end of said bellows and movable therewith, said tubular member carrying a valve seat and having a part extending axially into said bellows and toward said inlet, means acting against said tubular member for resisting expansion of said bellows and the consequent movement of said tubular member and valve seat, a valve carried by said tubular member and movable toward and away from said seat for controlling the flow of fluid from said inlet through said bellows, snap action mechanism carried by said casing and acting against said valve for forcibly holding the latter against said seat until said bellows has extended and shifted said tubular member and said valve seat a predetermined amount, and a temperature responsive device reacting against said casing and connected with the axially extended portion of said tubular member for shifting the latter and said valve seat.

14. A relief valve comprising a shiftable member, temperature responsive means for shifting said member, a valve seat carried by said member, a valve member movable with said member and shiftable from a position closing said valve seat to a position opening the same, a pivoted lever connected with said shiftable member, spring means resisting movement of said member in one direction, and a snap action mechanism acting against said lever for holding said valve member in the closed position during the first part of the movement of said member and acting against the lever to move the valve member to the open position upon an additional movement of said member.

15. In a device of the class described, a frame having a fluid inlet, an expansible bellows anchored at one end over said inlet and carrying a valve seat at the other end, a valve engaging said seat to form a closure for the bellows, a loading spring for opposing expansion of the bellows, snap mechanism comprising a hill-shaped cam and a spring loaded element and a follower element, one of the elements being associated with the valve and the other element being associated with the frame, and a spring acting through said elements to hold the valve against the seat when the bellows is contracted and acting through said elements to snap the valve from its seat when the expansion of the bellows moves the seat and valve outwardly beyond a predetermined position.

16. In a device of the class described, a frame having a fluid inlet, an expansible bellows anchored at one end over said inlet and carrying a valve seat at the other end, a valve engaging said seat to form a closure for the bellows, a loading spring for opposing expansion of the bellows, a lever connected to the valve, said lever carrying a follower and a spring pressed cam yieldably carried by the frame, a predetermined expansion of the bellows pushing the valve and connected lever outwardly to a position where the follower rides over the crest of the cam.

17. A relief valve comprising, in combination, spring loaded pressure responsive means, a valve seat operatively connected with said yieldable pressure responsive means and movable therewith, a valve member for said valve seat, and spring biased detent means normally holding said valve member against said valve seat, movement of said valve seat and valve on pressure increase causing said biased detent means to release said valve member from said valve seat.

18. A relief valve comprising, in combination, movable pressure responsive means, a valve seat carried by said means and movable therewith, a first coil spring operatively associated with said flexible pressure responsive means and resisting extension thereof, a valve member for said valve seat, biased detent means normally holding said valve member against said movable valve seat, and a second coil spring of less strength than said first coil spring concentric with the first coil spring for biasing said detent means, movement of said valve seat by said pressure responsive means on pressure increase causing said biased detent means to release said valve member from said valve seat.

19. A valve of the class described comprising, a frame, a valve seat member movably mounted on said frame, means interconnecting said valve seat member and said frame providing a fluid tight connection therebetween and permitting movement of the former with respect to the latter, a valve closure member cooperating with said seat member, a snap mechanism comprising a cam element and a cooperating cam follower element, one of said elements being operatively connected to one of said members and the other being mounted on said frame, a spring for loading said snap mechanism, said spring acting through said snap mechanism normally to hold said valve closure member against said valve seat member against the fluid pressure to be controlled, a fluid pressure operated member subject to the pressure to be controlled, and a loading spring for opposing the movement of the last named member, said last named member moving both of said elements with respect to said frame to cause the first mentioned spring to lose its power to hold said valve closure member upon said valve seat member whereupon said snap mechanism operates said valve closure member to the open position.

20. A valve of the class described comprising, a frame, a valve seat member movably mounted on said frame, means interconnecting said valve seat member and said frame providing a fluid tight connection therebetween and permitting movement of the former with respect to the latter, a valve closure member cooperating with said seat member, a snap mechanism comprising a cam element and a cooperating cam follower element, one of said elements being operatively connected to one of said members and the other being mounted on said frame, a spring for loading said snap mechanism, said spring acting through said snap mechanism normally to hold said valve closure member against said valve seat member against the fluid pressure to be controlled, a fluid pressure operated member subject to the pressure to be controlled, a loading spring for opposing the movement of the last named member, said last named member moving both of said elements with respect to said frame to cause the first mentioned spring to lose its power to hold said valve closure member upon said valve seat member whereupon said snap mechanism operates said valve closure member to the open position, and means carried by said last named member and actuated by said loading spring upon drop in fluid pressure on said last named member for shifting the relative position of the elements of said snap mechanism to cause said first spring acting through the snap action to throw said valve closure member back upon said valve seat member to closed position and to hold the same closed.

OSCAR F. CARLSON.